2,703,691

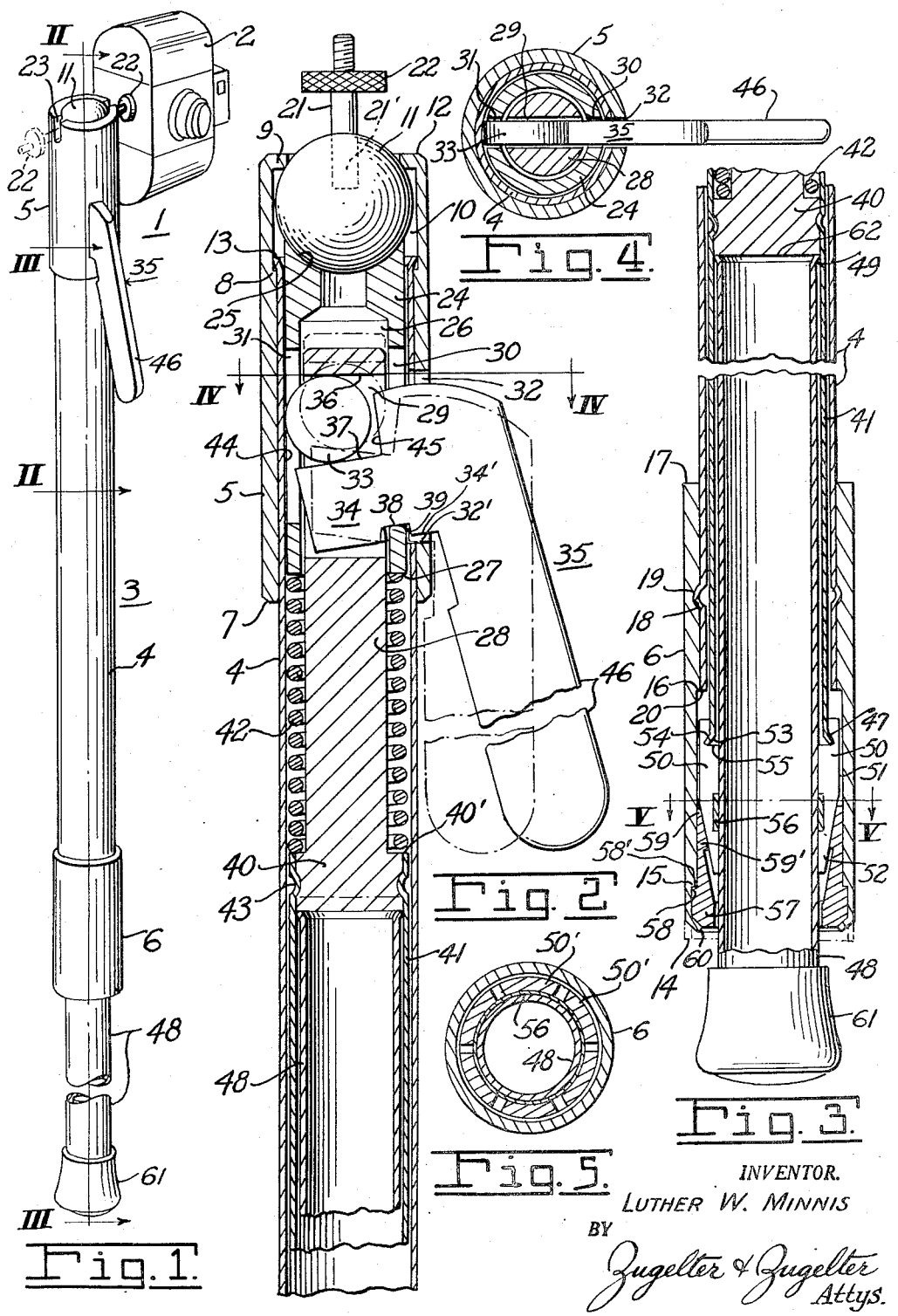

CAMERA SUPPORT

Luther W. Minnis, San Bernardino, Calif.

Application June 15, 1954, Serial No. 436,829

6 Claims. (Cl. 248—161)

This invention relates to camera supports, and more particularly to extensible camera supports.

An object of this invention is to provide a camera support which is compact and readily and easily portable.

A further object of this invention is to provide a camera support of the above character which is sturdily constructed to provide rigid and steady support for a camera.

A further object of this invention is to provide a camera support having means for pivotally securing a camera adjacent one end thereof, a telescoping leg extensible from the other end thereof, means locking the camera securing means and the leg in position relative to the remainder of the support and means for releasing the locking means incident to repositioning of the lockable elements.

A further object of this invention is to provide a camera support of the above character which has a single control adapted for actuation by the hand in which the support is held and for releasing the camera securing means for positioning same while simultaneously releasing the telescoping leg in order that same may be drawn outwardly from or pushed into the member for receiving same, either under the force of gravity or otherwise.

Other objects of the invention will be apparent to those skilled in this art from the following description taken in conjunction with the accompanying drawing in which:

Figure 1 is a view in perspective of a camera support embodying this invention having means adjacent one end thereof in engagement with a camera;

Fig. 2 is a fragmentary view in longitudinal cross-section of the device illustrated in Fig. 1 and taken along the line II—II in Fig. 1;

Fig. 3 is a fragmentary view in longitudinal cross-section of the device shown in Fig. 1 and taken along the line III—III in Fig. 1;

Fig. 4 is a view in transverse cross-section of the device illustrated in Fig. 2 and taken along line IV—IV in Fig. 2; and Fig. 5 is a view in transverse cross-section taken along the line V—V in Fig. 3.

In Fig. 1 of the drawing a camera support 1 is shown in vertical or erect position with a camera 2 secured to the upper end thereof. Support 1 has a body or frame 3 comprising a relatively thin-walled, tubular central portion 4 provided with reinforcing sleeve-like end portions 5 and 6. An axial bore extends through sleeve 5. From end 7 to shoulder face 8, the bore is adapted to snugly receive a portion of tube 4. From face 8 to inwardly projecting lip 9, the bore is of larger diameter to provide a cavity or socket 10 adapted to receive ball or sphere 11. Adjacent end 12, the bore is constricted by lip 9 to a diameter less than the diameter of the bore adjacent end 7. Before sleeve 5 is secured to tube 4, ball 11 is inserted from end 7 through the axial bore into position in cavity 10 adjacent lip 9. Tube 4 is then inserted behind ball 11 until its end 13 projects a short distance into cavity portion 10. While sleeve 5 and tube 4 are so positioned, tube 4 adjacent end 13 thereof is flared to lock sleeve 5 in position. Ball 11 is preferably harder than sleeve 5 or tube 4, and, as shown, ball 11 and tube 4 may be of equal outside diameter. If desired, ball 11 may be forced against end 13 to flare tube 4 which with lip 9 then serves to retain ball 11 in cavity 10.

As shown in Figs. 1 and 3, sleeve 6 has an axial bore which, prior to complete assembly of the camera support, has a cylindrical section of maximum diameter extending from end 14 of sleeve 6 (shown in dot-dash lines in Fig. 3) to shoulder face 15 spaced therefrom, a section of reduced diameter extending from shoulder face 15 to shoulder face 16, and a portion of smallest diameter which extends from adjacent face 16 to end 17 of sleeve 6. As shown, the latter portion of the axial bore is adapted to snugly receive a portion of tube 4. An annular groove 18 is provided in the wall of this portion of the bore intermediate the ends thereof. As shown most clearly in Fig. 3, bulged or flared portion 19 of tube 4 co-operates with annular groove 18 to join sleeve 6 to tube 4 with shoulder face 16 flush with end face 20.

A radially projecting post 21 is firmly secured to ball 11 as indicated in Fig. 2. A socket may be provided in ball 11 adapted to receive a root portion 21' of post 21, pressed, screwed, or otherwise firmly secured therein. A portion of post 21 adjacent the free end thereof is provided with threads adapted to co-operate with the tripod socket of camera 2 and nut 22 provided to function as a stop shoulder or lock nut engageable with camera 2 to lock it in fixed position relative to post 21. Thus, post 21, camera 2, and ball 11 may be joined together rigidly. I prefer to provide lateral slots 23 adjacent end 12 to permit post 21 to swing to a position perpendicular to the axis of sleeve 5 as shown in Fig. 1. Post 21 may be swung through an arc of at least 180° from the position shown in full lines to the position shown in dash lines in Fig. 1 and through a slightly smaller arc when it contacts lip 9 at the ends thereof.

Ball clamping member 24 is reciprocably received in the bore of tube 4 and adapted to be urged against ball 11 for clamping same between lip 9 and the seat-like end face 25 of member 24 to clamp ball and post 21 in position relative to frame 3 as desired. An axial bore 26 extending into member 24 from end 27 thereof is adapted to receive a portion of apertured tongue 28 with elongate aperture 29 therein in registry with elongate slot-like apertures 30 and 31 disposed diametrically opposite each other in member 24 and aperture 32 in frame 3. As shown most clearly in Figs. 2 and 4, apertures 29, 30 and 31 are adapted to receive roll 33 and one arm 34 of crank lever 35 inserted through aperture 32, roll 33 being disposed between and engageable in rolling contact with end wall 36 of aperture 29 in tongue 28 and face 37 of crank 35. Notch 38 provided in crank 35 is adapted to co-operate with end wall 39 of aperture 30. End wall or face 39 serves as a fulcrum for crank lever 35 and as shown in Fig. 2, may be of cylindrical form. Notch 38 also co-operates with member 24 to retain arm 34 of crank lever 35 in operative relation with roll 33 and fulcrum face 39. Tongue 28 has an enlarged annular shoulder 40 adapted to be joined to elongate tubular member 41. As shown in Fig. 2, shoulder 40 may have an annular groove 43 into which a portion of tubular member 41 may be pressed to effect rigid unitary interlocking of the two parts. Helical spring 42 encircling tongue 28 between shoulder 40 and member 24 has its ends respectively in abutment with shoulder face 40' and end face 27 of member 24. When, as shown in Fig. 2 and described above, the various parts are so assembled, spring 42 is under compression and tends to urge tongue 28 and member 24 toward separation. Tongue 28 and member 24 may be telescopically drawn more closely together to further compress spring 24 between faces 40' and 27 by swinging crank arm 46 toward the position of parallelism with body 3 shown in dot-dash lines in Fig. 2.

Tubular extension leg 48 is telescopically received in the bore of member 41. Leg 48 has an outwardly flared flange 49 adjacent one of its ends. Flange 49 co-operates with the wall of the bore in member 41 to hold leg 48 in alignment with member 41. A tubular wedge ring or collar 50 comprising a plurality of annularly spaced segments 50' (shown most clearly in Fig. 5) has an axial bore extending therethrough adapted to slidably receive leg 48, adjacent end 52 thereof. Adjacent end 51 of wedge ring collar 50, an enlarged section of said axial bore is adapted to receive a portion of tubular member 41. Segmental wedge collar 50 is cylindrical adjacent end 51 and tapers frusto-conically to end 52 from the cylindrical portion. Spaced from end 51, an annular V-groove 53 is provided in the wall of the bore of collar 50 for receiving and co-operatively engaging outwardly flared frusto-conic end flange 47 on tube 41. The groove 53 has a frusto-conic wall 54 adjacent end 51 and a flat wall 55 perpendicular to the axis of collar 50. A second annular groove is provided in the wall of the bore in collar 50 intermediate V-groove 53 and end 52, for receiving a circumferentially expandable split ring 56 of spring metal for urging segments 50' radially outwardly adjacent end 52. A tubular wedge bushing 57 is provided with an external shoulder 58 having end face 58' adapted to abut shoulder face 15 when bushing 57 is in position in sleeve 6. The axial bore of wedge bushing 57 comprises a frusto-conic portion and a cylindrical portion adjoining the small end thereof. As shown in Fig. 3, an annular shoulder 59' is provided in the bore of bushing 57 adjacent thin end 59 thereof, adapted to co-operate with the external conic face of wedge ring 50 to wedgingly urge segments 50' into frictional gripping relation with leg 48 when ring 50 is advanced into bushing 57. In Fig. 3, the co-operating frusto-conic faces of ring 50 and bushing 57 are shown inclined to the axis at an angle of approximately 11° which I have found works well.

Leg 48 and means for locking same relative to frame 3 may be assembled as follows, after member 24 and spring 42 are in place in frame 3, as described above.

Tubular member 41 may be partially inserted into frame 3, tongue 28 end first, with a portion adjacent flanged end 47 projecting therefrom. Leg 48 is inserted into the bore of tubular member 41, flange 49 end first. Split ring 56 is slipped onto leg 48 and segmental tubular wedge ring 50 assembled with conic flange 47 in co-operative engagement with V-groove 53 and spring 56 received in the annular groove provided therefor in segments 50'. Bushing 57 may then be slipped onto leg 48 and advanced to encircle and embrace a portion of the frusto-conically tapered portion of wedge ring 50. The assembly may be slid into the position in frame 3 (shown in Fig. 3) and retaining lip 60 turned or formed to hold wedge bushing 57 in permanently fixed relation to the reinforcing sleeve portion 6 of frame 3. Leg 48 may be pressed further into frame 3 with its end flange 49 abutting end face 62 of the base of tongue 28 to advance tongue 28 through helical spring 42 into the bore of member 24 until apertures 29, 30, 31 and 32 are in registry. Roll 33 and arm 34 of crank 35 may then be inserted as described above. A suitable tip such as the cup-like, resilient crutch tip 61 may be provided on the end of leg 48.

Actuation of lever 46 in co-operative relation to fulcrum 39, from the spring biased position shown in full lines toward the position shown in dot-dash lines in Fig. 2, effects telescoping of tongue 28 into member 24 to move member 24 and segmental wedge ring 50 toward each other. The telescoping movement continuing as edge face 34' is moved into operative engagement with face 32' which functions as a second fulcrum for crank lever 35 to effect positive movement of segmental wedge ring 50 toward the upper end 12 of frame 3, whereby leg 48 and ball 11 are released, the movement of segmental wedge ring 50 toward end 12 being less than the relative movement of member 24 and ring 50 toward each other.

It may be noted that when member 41 is moved further away from bushing 57, flange 47 co-operates with wall 54 of V-groove 53 to urge collar 50 to expand adjacent end 51 as it is drawn away from bushing 57. Thus collar 50 is urged to expand by flange 47 and split ring spring 56. Lever 46, when released, moves toward the full line position shown in Fig. 2 as member 24 and collar 50 move further apart into locking engagement with ball 11 and leg 48, respectively. It may be noted that as member 41 advances toward bushing 57 it exerts a substantially straight line thrust parallel to the axis of collar 50 through abutment of flange 47 against face 55 of V-groove 53.

In use with camera 2 attached, the support 1 may be held in erect position, as shown in Fig. 1, by one hand which simultaneously grips lever 46 and frame 3 adjacent thereto with camera 2 at the desired height above the surface upon which the support is to be supported, i. e., the ground, floor, or other surface. Camera 2 may be held with the other hand while lever 46 is squeezed toward frame 3, leg 48 and ball 11 are released to permit the positioning of the camera relative to frame 3 while leg 48 drops under force of gravity into engagement with the support surface. Release of lever 46 locks the several parts in the desired relationship. To retract leg 48 and position camera 2 for carrying, lever 46 need only be actuated and frame 3 lowered until leg 48 is in retracted position as camera 2 is moved to desired carrying position and thereafter, lever 46 may be released to relock the parts in the carrying relationship.

Conic end flange 49 is larger in diameter than the axial bore extending through collar 50 between wall 55 of V-groove 53 and end 52 of wedge ring 50 and thus engages face 55 to preclude movement of leg 48 into in-operative relationship with wedge collar 50 as by complete withdrawal from the body 3.

Having described the invention, it will be apparent to those skilled in this art, that various modifications and changes may be made in the illustrated embodiment without departing from the spirit or the scope of the invention.

Therefore, what I claim as new and desire to secure by Letters Patent is:

1. For a camera, an extensible support comprising a frame, a swingable camera post mounted adjacent one end thereof, a leg member telescopically extensible from the other end, an actuating lever, means for clamping said post and said leg in fixed relation to said frame, said clamping means being connected to and adapted to be released by actuation of said lever, whereby a camera may be supported as desired.

2. A camera support which comprises an elongated body member, a camera bracket pivotally mounted at one end of said body, a support leg telescopically connected to the body and extensible from the other end thereof, locking mechanism engageable with the bracket, locking mechanism engageable with the leg, and a hand operated lock release connected to both locking mechanisms for releasing and actuating said locking mechanisms in unison.

3. For a camera an extensible support comprising an elongate hollow frame, a camera post pivotally secured adjacent one end of said frame and adapted for firm engagement with a camera to be supported, a post securing member reciprocable longitudinally of said frame for releasably securing said post against pivotal movement relative to said frame, an elongate leg member telescopically received in said hollow frame and extending longitudinally from the second end of the frame, said leg member being longitudinally reciprocable relative to said frame, leg gripping means adjacent the second end of said frame for releasably gripping said leg member to preclude movement thereof relative to said frame, means resiliently urging said post securing member and said leg gripping means toward gripping position, and a lever operable to release said post securing member and said leg gripping means in unison whereby said camera post may be swung into a position as desired and said leg member positioned in an extended position as desired and locked in the desired positions when said lever is released.

4. A camera support in accordance with claim 3 characterized by the fact that said leg gripping means comprise a segmental wedge collar reciprocable relative to a wedge bushing secured in said hollow frame in co-operative relation to said collar, and means for reciprocating said collar into and out of gripping relation to said leg.

5. For a camera an extensible support comprising an elongate hollow frame having a retaining lip adjacent one end of the bore therein, a sphere in said bore adapted to co-operatively contact said retaining lip, means for securing a camera in fixed spaced relation to said sphere, an annular shoulder spaced from said lip in said bore, an extensible leg telescopically received in said bore, and clamping means adapted to co-operate with said shoulder to clamp said leg while simultaneously clamping said sphere against said lip, resilient means biasing said clamping means toward clamping relation, and means for moving said clamping means into non-clamping relation with said leg and sphere to permit repositioning of said sphere and said leg relative to said frame.

6. For a camera an extensible support comprising an elongate frame having a longitudinal bore extending therethrough, a pivot member disposed therein adjacent one end thereof, camera mounting means secured to said pivot member and projecting beyond the adjacent end of said support, a telescopically extensible leg member received in said bore with a portion of said leg projecting from the second end of said bore, a pivot clamping member reciprocable in said bore, leg clamping means including a reciprocable actuating member, resilient means urging said pivot clamping member and said reciprocable actuating member to advance toward said pivot member and said second end of said bore to effect clamping of said pivot member and said leg in fixed position relative to said frame, a lever adapted for moving and holding said reciprocable members against the urging of said resilient means to release said clamping means while said pivot member and said leg are positioned relative to said frame.

References Cited in the file of this patent

UNITED STATES PATENTS 431,036   Dawson _____ July 1, 1890